(12) United States Patent
Møller (10) Patent No.: US 12,370,725 B2
(45) Date of Patent: Jul. 29, 2025

(54) CLAMPING TONG AND A MOULD SYSTEM COMPRISING THE SAME

(71) Applicant: LM WIND POWER A/S, Kolding (DK)

(72) Inventor: Jesper Møller, Kolding (DK)

(73) Assignee: LM WIND POWER A/S, Kolding (DK)

( * ) Notice: Subject to any disclaimer, the term of this patent is extended or adjusted under 35 U.S.C. 154(b) by 380 days.

(21) Appl. No.: 17/776,422

(22) PCT Filed: Nov. 13, 2020

(86) PCT No.: PCT/EP2020/082092
§ 371 (c)(1),
(2) Date: May 12, 2022

(87) PCT Pub. No.: WO2021/094558
PCT Pub. Date: May 20, 2021

(65) Prior Publication Data
US 2022/0402171 A1    Dec. 22, 2022

(30) Foreign Application Priority Data

Nov. 15, 2019  (GB) .................................... 1916809

(51) Int. Cl.
*B29C 33/20*    (2006.01)
*B29C 33/26*    (2006.01)
*B29L 31/08*    (2006.01)

(52) U.S. Cl.
CPC ............ *B29C 33/202* (2013.01); *B29C 33/26* (2013.01); *B29L 2031/082* (2013.01)

(58) Field of Classification Search
CPC ............ B29C 33/202; B29C 2033/207; B29C 70/541; F16B 2/10
See application file for complete search history.

(56) References Cited

U.S. PATENT DOCUMENTS 4,316,700 A * 2/1982 Schramm .............. B64C 27/473
416/241 A
9,321,168 B2 * 4/2016 Brassette ................. B25H 1/04
(Continued)

FOREIGN PATENT DOCUMENTS

CN  201833510 U  5/2011
CN  208452084 U  2/2019
(Continued)

OTHER PUBLICATIONS

JP2015231645 Translation (Year: 2024).*

*Primary Examiner* — James Sanders
(74) *Attorney, Agent, or Firm* — Nath, Goldberg & Meyer; Jerald L. Meyer; Tanya E. Harkins (57) ABSTRACT

Disclosed are a mould system and a clamping tong for securing a mould item part in a mould of a mould system. The clamping tong comprises: a primary tong segment comprising a primary clamping surface for applying clamping pressure on a clamping portion of a mould item part; a secondary tong segment coupled to the primary tong segment and comprising a secondary clamping surface for applying clamping pressure on a clamping portion of the mould. The clamping tong being configured to change between a clamping state and a release state, wherein the distance between the primary clamping surface and the secondary clamping surface in the clamping state is shorter than the distance between the primary clamping surface and the secondary clamping surface in the release state.

22 Claims, 8 Drawing Sheets

(56) References Cited

U.S. PATENT DOCUMENTS

2006/0188378 A1* 8/2006 Bech ................ B29C 66/112
  416/227 R
2017/0043456 A1   2/2017 Larkin
2017/0051871 A1   2/2017 Brzezicki

FOREIGN PATENT DOCUMENTS

| EP | 2 783 840 A1 | 10/2014 | | |
| FR | 2900358 A1 | * | 11/2007 | ............ B25B 11/02 |
| GB | 2 216 838 A | 10/1989 | | |
| JP | 2014-159061 A | 9/2014 | | |
| JP | 2015231645 A | * | 12/2015 | |
| WO | 2019/011970 A1 | 1/2019 | | |

* cited by examiner

CLAMPING TONG AND A MOULD SYSTEM COMPRISING THE SAME

This is a National Phase Application filed under 35 U.S.C. 371 as a national stage of PCT/EP2020/082092, filed Nov. 13, 2020, an application claiming the benefit of Great Britain Application No. 1916809.5, filed Nov. 15, 2019, the content of each of which is hereby incorporated by reference in its entirety.

The present disclosure relates to a clamping tong and a mould system comprising a clamping tong. Particularly a mould system for moulding a mould item, such as a shell of a wind turbine blade, and a clamping tong for securing a mould item part, such as a part of the shell of the wind turbine blade, in a mould of the mould system.

BACKGROUND

Wind turbine blades of fibre-reinforced polymer and in particular the aerodynamic shells of wind turbine blades are usually manufactured in moulds, where the pressure side and the suction side of the blade are manufactured separately by arranging glass fibre mats and/or other fibre-reinforcement material, such as carbon fibre, in each of the two mould parts. Afterwards, one of the two halves are turned upside down and positioned on top of the other of the two halves, and the two halves are glued together.

The blade parts may be positioned on top of each other by turning and repositioning the complete half mould.

It is known for manufacturers of wind turbine blades, when manufacturing blades in two halves, that it is necessary to secure and prevent the one blade shell part from falling out of the mould, during turning of the mould, such as when positioning the one blade shell part on top of the other.

To prevent the blade shell part from falling out of the mould during turning and repositioning of the respective half mould, the blade shell part may be fixed to the mould with a number of clamping tongs. Between use, the tongs are normally stored on a shared rack. Thus, each time the tongs are used, different tongs may be used in different positions on the mould, which means that each time a tong is mounted on the mould, it has to be manually adjusted.

The necessity to manually adjust each clamping tong involves a risk that some of the clamping tongs may not be tightened sufficiently. Thus, there is a risk that the blade shell part may fall out of the mould during turning of the mould, which may lead to hazardous situations. Furthermore, manually adjusting each clamping tong is time consuming, leading to increased manufacturing time.

Thus, it is of increasing interest to reduce the need for manually adjusting the clamping tongs and reducing the risk of clamping tongs coming loose, since such a solution might lead to reduction in manufacturing time as well as improving safety during manufacturing.

SUMMARY

It is an object of the present disclosure to provide a mould system and a clamping tong which overcomes at least some of the disadvantages of the prior art.

In particular, it is an object of the present invention to provide a mould system and a clamping tong, which improve the process of securing a mould item or part thereof in the mould. Improvement in the process of securing the mould item may further decrease manufacturing variations and enhance mechanical properties of the assembled blade, in addition to making the working environment safer for the staff.

Accordingly, a clamping tong is disclosed, such as a clamping tong for securing a mould item part, e.g. a shell part, such as a half shell, of a wind turbine blade, in a mould for moulding the mould item part. The mould may be the first mould or the second mould of the mould system disclosed below.

The clamping tong comprises a primary tong segment comprising a primary clamping surface for applying clamping pressure on a clamping portion of the mould item part. The clamping tong comprises a secondary tong segment coupled to the primary tong segment and comprising a secondary clamping surface for applying clamping pressure on a clamping portion of the mould, such as a clamping portion of a support frame of the mould.

The clamping tong is configured to change between a clamping state and a release state, wherein the distance between the primary clamping surface and the secondary clamping surface in the clamping state is shorter than the distance between the primary clamping surface and the secondary clamping surface in the release state. Thereby, the clamping tong may, in the clamping state, provide a clamping force on the clamping portion of the mould item part, such as to secure the mould item part in the mould. The clamping tong may comprise a spring mechanism to maintain the clamping tong in the clamping state and the release state.

Also disclosed is a mould system for moulding a mould item, such as a blade shell of a wind turbine blade. The mould system comprises a first mould for manufacturing a first mould item part of the mould item and a second mould for moulding a second mould item part of the mould item. For example, the first mould may be configured for manufacturing a first shell part, such as the upwind shell part, of the blade shell of the wind turbine blade, and the second mould may be configured for manufacturing a second shell part, such as the downwind shell part, of the blade shell of the wind turbine blade.

The first mould has a first mould element with a first moulding surface for defining an outer shape of the first mould item part. The first mould has a first support frame to support the first mould element.

The second mould has a second mould element with a second moulding surface for defining an outer shape of the second mould item part. The second mould has a second support frame to support the second mould element.

The mould system comprises a first clamping tong, such as the disclosed clamping tong. The mould system may comprise a plurality of clamping tongs, each of which may be a clamping tong such as the clamping tong disclosed herein. The plurality of clamping tongs may include the first clamping tong and a second clamping tong. The plurality of clamping tongs may be distributed along at least a part of the periphery of the first moulding surface, and optionally along at least a part of the periphery of the second moulding surface.

The mould system may be configured to position the first mould and the second mould such that the first moulding surface is facing the second moulding surface, e.g. by turning and repositioning the first mould. For example, such that the first mould item part may be bonded, e.g. glued, with the second mould item part so as to form the mould item.

The first mould may comprise a first mould flange along at least a part of the periphery of the first moulding surface. The first mould flange may be configured to provide a first mould item part flange on the first mould item part. The second mould may comprise a second mould flange along at least a part of the periphery of the second moulding surface. The second mould flange may be configured to provide a second mould item part flange on the second mould item part.

The primary clamping surface of any of the clamping tongs may be configured for applying clamping pressure on a clamping portion of the mould item part flange of the mould item part, e.g. on a clamping portion of the first mould item part flange or on a clamping portion of the second mould item part flange.

The clamping tong(s) may comprise a tong coupling element and/or a mould coupling element. The tong coupling element may be configured to releasably engage with the mould coupling element. The mould coupling element may be configured to be attached to the mould, e.g. to a support frame of the mould. For example, the mould coupling element of the first clamping tong may be attached to the first mould at a first tong position and/or the mould coupling element of the second clamping tong may be attached to the first mould at a second tong position. The mould coupling element, such as the mould coupling element of the first clamping tong and/or the mould coupling element of the second clamping tong, may be attached, or be configured to be attached, to the first support frame of the first mould. The tong coupling element, the mould coupling element, and the releasable engagement between the two may provide for the clamping tong being conveniently stored near the position where it is used. The mould coupling element may be attached, or be configured to be attached, to a surface, such as a surface of the support frame of the mould, which is facing substantially downwards. The mould coupling element may be fixedly attached, or configured to be fixedly attached, to the mould, e.g. by gluing and/or bolting the mould coupling element to the mould, e.g. to the support frame of the mould.

The clamping tong can be arranged in an operating configuration and in a storage configuration. The tong coupling element may be engaged with the mould coupling element in the storage configuration. The tong coupling element may be disengaged with the mould coupling element in the operating configuration. In the operating configuration, the primary clamping surface of the primary tong segment may apply clamping pressure on a clamping portion of the mould item part and the secondary clamping surface of the secondary tong segment may apply clamping pressure on a clamping portion of the mould. In the storage configuration, the primary clamping surface of the primary tong segment may be not in contact with the mould item part. Furthermore, the secondary clamping surface of the secondary tong segment may be not in contact with the mould, in the storage configuration.

The mould coupling element of a clamping tong, such as the mould coupling element of the first clamping tong and/or the second clamping tong, may comprise a primary element portion being substantially planar and a secondary element portion being substantially planar. The primary element portion may join the secondary element portion along a joint line, such as a straight joint line. A coupling element angle may be formed between the primary element portion and the secondary element portion about the joint line. The coupling element angle may be between 95-175 degrees, e.g. between 110-160 degrees, e.g. between 120-150 degrees, e.g. 135 degrees. Providing the mould coupling element with the coupling element angle may facilitate a storage position of the clamping tong where the clamping tong is kept out of the way, i.e. where it does not interfere with work on and around the mould. For example, the primary element portion of the mould coupling element may be attached, or configured to be attached, to the mould, e.g. to the support frame of the mould. The primary element portion of the mould coupling element may be attached, or be configured to be attached, to a surface, such as a surface of the support frame of the mould, which is facing substantially downwards. In situations where the coupling element angle is more than 90 degrees, and the primary element portion is attached to a substantially horizontal downward facing surface, the secondary element portion may extend further underneath the mould, i.e. such arrangement may further facilitate storage of the clamping tong in a position where interference with work around the mould is minimized.

The tong coupling element may be part of the primary tong segment, e.g. the primary tong segment may comprise the tong coupling element. The primary clamping surface of the primary tong segment may be arranged on part of a surface of the tong coupling element.

The tong coupling element may comprises a magnetic tong element. The mould coupling element may comprise magnetic mould element. The magnetic tong element may be configured to magnetically attach to the magnetic mould element. The magnetic tong element and/or the magnetic mould element may comprise a permanent magnet. The magnetic tong element and/or the magnetic mould element may comprise a ferromagnetic material. The magnetic mould element of the mould coupling element may be provided on the secondary element portion of the mould coupling element.

The clamping tong(s), such as the first clamping tong and/or the second clamping tong, may comprise a safety wire. The safety wire may be configured to restrict displacement of the clamping tong relative to the mould. For example, the safety wire may restrict displacement of the clamping tong to be within a displacement radius from a connection point of the safety wire on the mould. The displacement radius may be less than a meter, such as less than 0.5 meters. The safety wire may facilitate that the same clamping tong is used for the same position along the mould each time the mould is used. Furthermore, the safety wire also prevents the clamping tong from falling from the mould in case of unintended release of the clamping tong during turning and repositioning of the mould.

The safety wire may extend from the mould coupling element. Thereby, the safety wire is attached to the mould by attachment of the mould coupling element to the mould. The safety wire may extend to the secondary tong segment. Attaching the safety wire to the secondary tong segment may be advantageous as this tong segment will be positioned closest to the mould coupling element. Alternatively, the safety wire may extend to the primary tong segment.

The primary clamping surface and/or the secondary clamping surface may be provided with a friction enhancing material. The friction enhancing material provides increased friction between the clamping surface and the respective clamping part, which reduces the risk of sudden slip of the clamping tong. The friction enhancing material may be a rubber material, e.g. ethylene propylene diene monomer rubber (EPDM). The rubber material may be vulcanized.

BRIEF DESCRIPTION OF THE FIGURES

Embodiments of the disclosure will be described in more detail in the following with regard to the accompanying figures. The figures show one way of implementing the present invention and are not to be construed as being limiting to other possible embodiments falling within the scope of the attached claim set.

DETAILED DESCRIPTION

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

Figure 1:
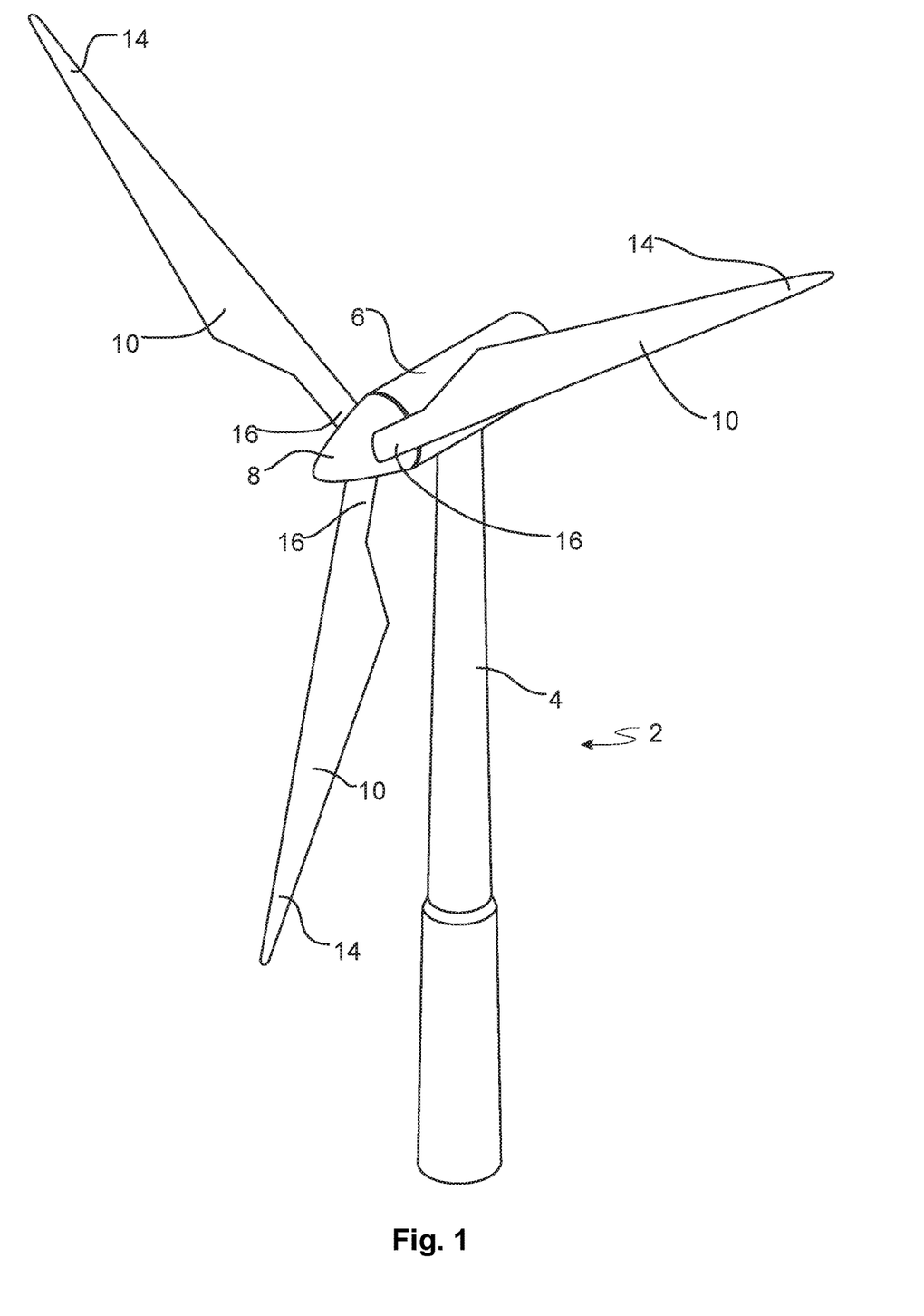
FIG. 1 illustrates a conventional modern upwind wind turbine.

FIG. 1 illustrates a conventional modern upwind wind turbine 2 according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8.

Figure 2:
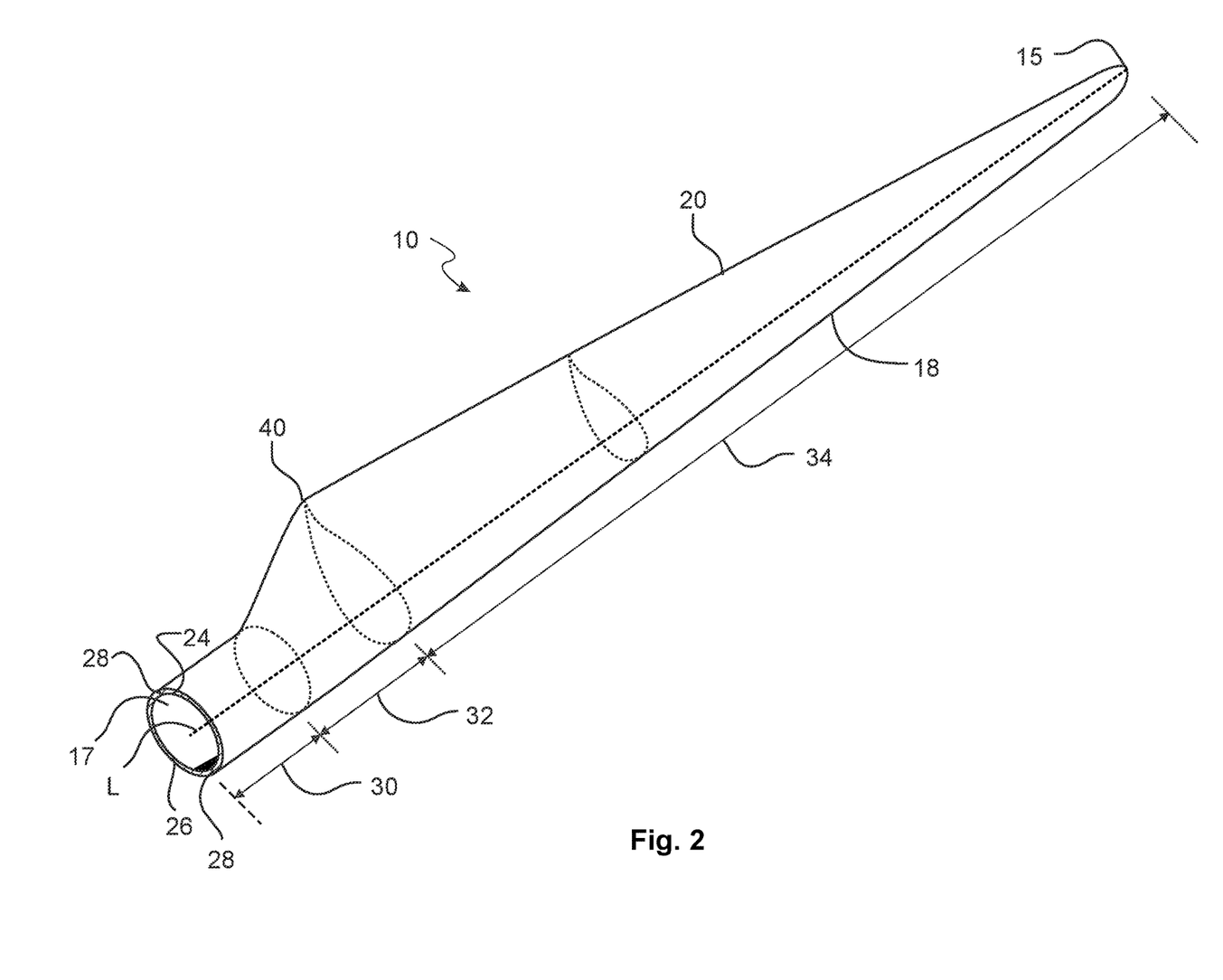
FIG. 2 shows a schematic view of an exemplary wind turbine blade.

FIG. 2 shows a schematic view of an exemplary wind turbine blade 10. The wind turbine blade 10 has the shape of a conventional wind turbine blade with a root end 17 and a tip end 15 and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The wind turbine blade 10 comprises a blade shell comprising two blade shell parts or half shells, a first blade shell part 24 and a second blade shell part 26, typically made of fibre-reinforced polymer. The wind turbine blade 10 may comprise additional shell parts, such as a third shell part and/or a fourth shell part. The first blade shell part 24 is typically a pressure side or upwind blade shell part. The second blade shell part 26 is typically a suction side or downwind blade shell part. The first blade shell part 24 and the second blade shell part 26 are fastened together with adhesive, such as glue, along bond lines or glue joints 28 extending along the trailing edge 20 and the leading edge 18 of the blade 10. Typically, the root ends of the blade shell parts 24, 26 has a semi-circular or semi-oval outer cross-sectional shape.

Figure 3:
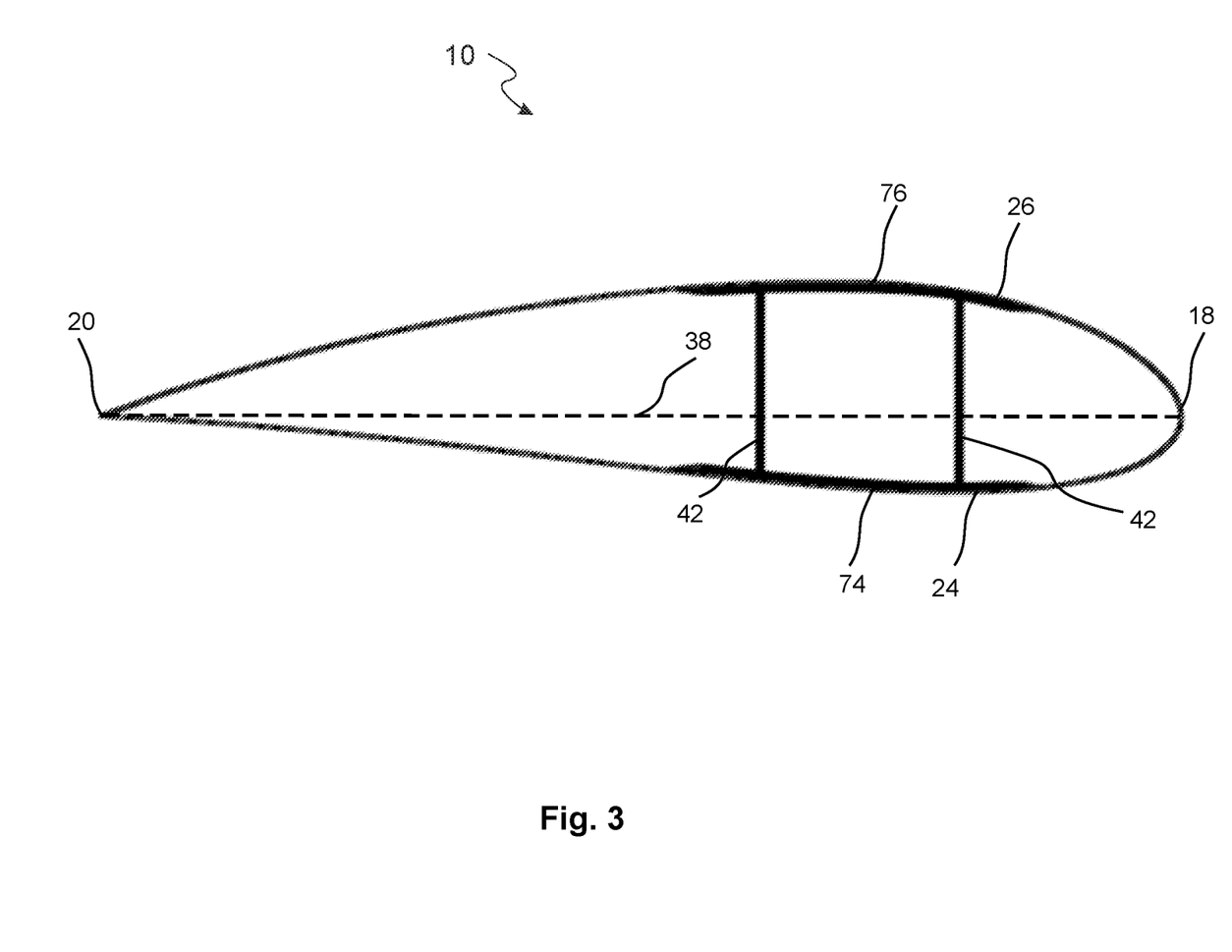
FIG. 3 is a schematic diagram showing a cross sectional view of an exemplary wind turbine blade.

FIG. 3 is a schematic diagram illustrating a cross sectional view of an exemplary wind turbine blade 10, e.g. a cross sectional view of the airfoil region of the wind turbine blade 10. The wind turbine blade 10 comprises a leading edge 18, a trailing edge 20, a pressure side 24, a suction side 26 a first spar cap 74, and a second spar cap 76. The wind turbine blade 10 comprises a chord line 38 between the leading edge 18 and the trailing edge 20. The wind turbine blade 10 comprises shear webs 42, such as a leading edge shear web and a trailing edge shear web. The shear webs 42 could alternatively be a spar box with spar sides, such as a trailing edge spar side and a leading edge spar side. The spar caps 74, 76 may comprise carbon fibres while the rest of the shell parts 24, 26 may comprise glass fibres.

Figure 4:
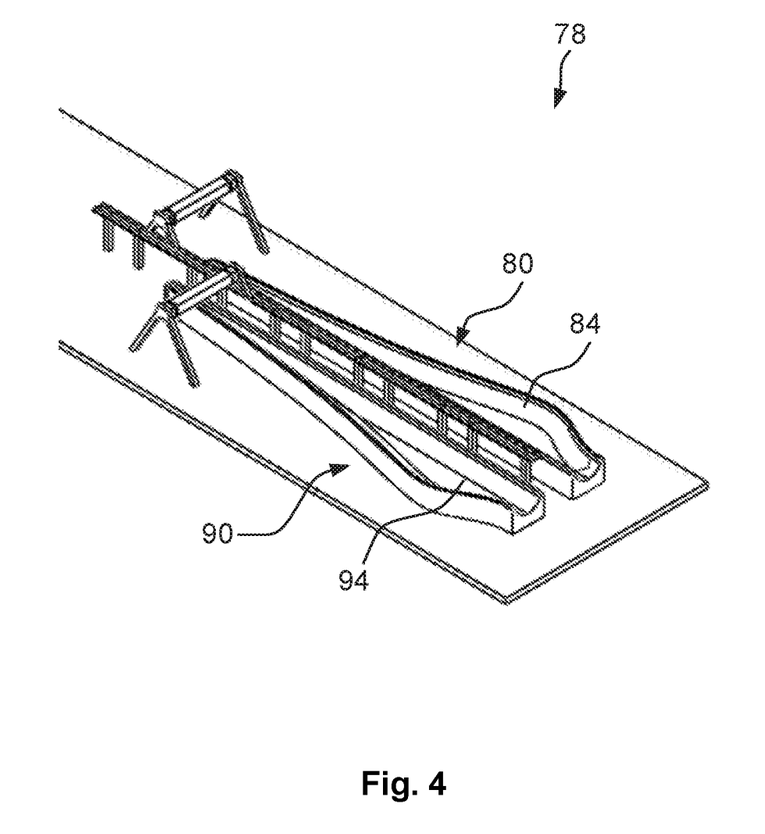
FIG. 4 is a schematic diagram illustrating an exemplary mould system.

FIG. 4 is a schematic diagram illustrating an exemplary mould system 78 for moulding a blade shell of a wind turbine blade. The mould system 78 comprises a first mould 80 and a second mould 90. The first mould 80 is configured for manufacturing a first blade shell part of a wind turbine blade, such as an upwind shell part of the wind turbine blade. The second mould 90 is configured for manufacturing a second blade shell part of the wind turbine blade, such as a downwind shell part of the wind turbine blade.

The first mould 80 has a first moulding surface 84. The second mould 90 has a second moulding surface 94. The mould system 78 is configured to, e.g. by a positioning device (not shown) the first mould 80 and the second mould 90 such that the first moulding surface 84 of the first mould 80 is facing the second moulding surface 94 of the second mould 90 and such that the first blade shell part may be bonded with the second blade shell part so as to form the blade shell of the wind turbine blade.

Figure 5:
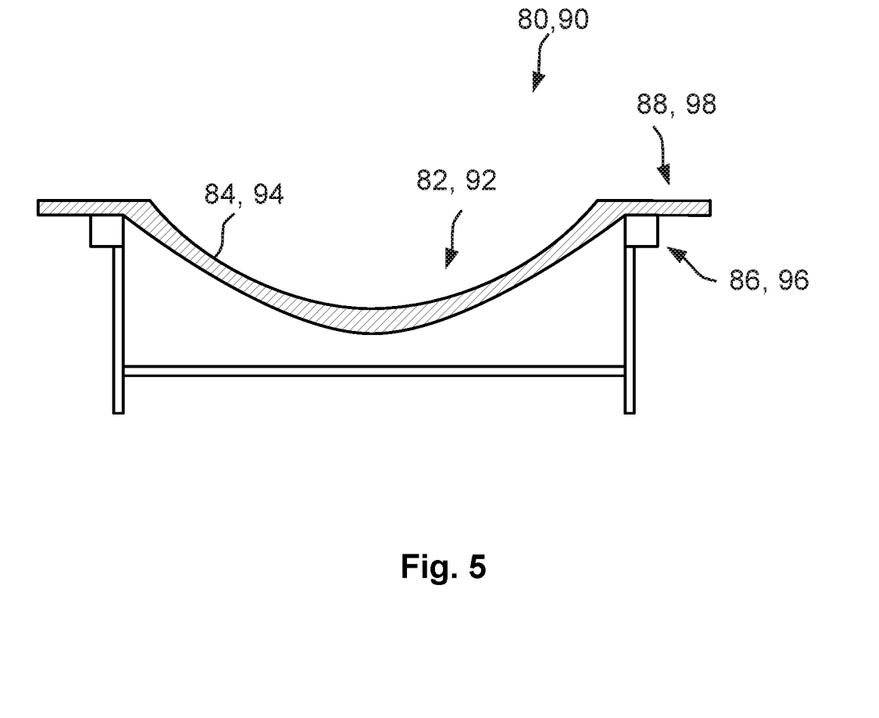
FIG. 5 is a schematic diagram illustrating an exemplary mould.

FIG. 5 is a schematic diagram illustrating an exemplary mould 80, 90, such as the first mould 80 or second mould 90 of FIG. 4.

The mould 80, 90 has a mould element 82, 92 with a moulding surface 84, 94. The moulding surface 84, 94 is configured for defining an outer shape the blade shell part.

The mould 80, 90 has a support frame 86, 96 to support the mould element 82, 92. The mould 80, 90 comprises a mould flange 88, 98 along at least a part of the periphery of the moulding surface 84, 94. The mould flange 88, 98 is configured to provide a blade shell part flange on the blade shell part.

Figure 6:
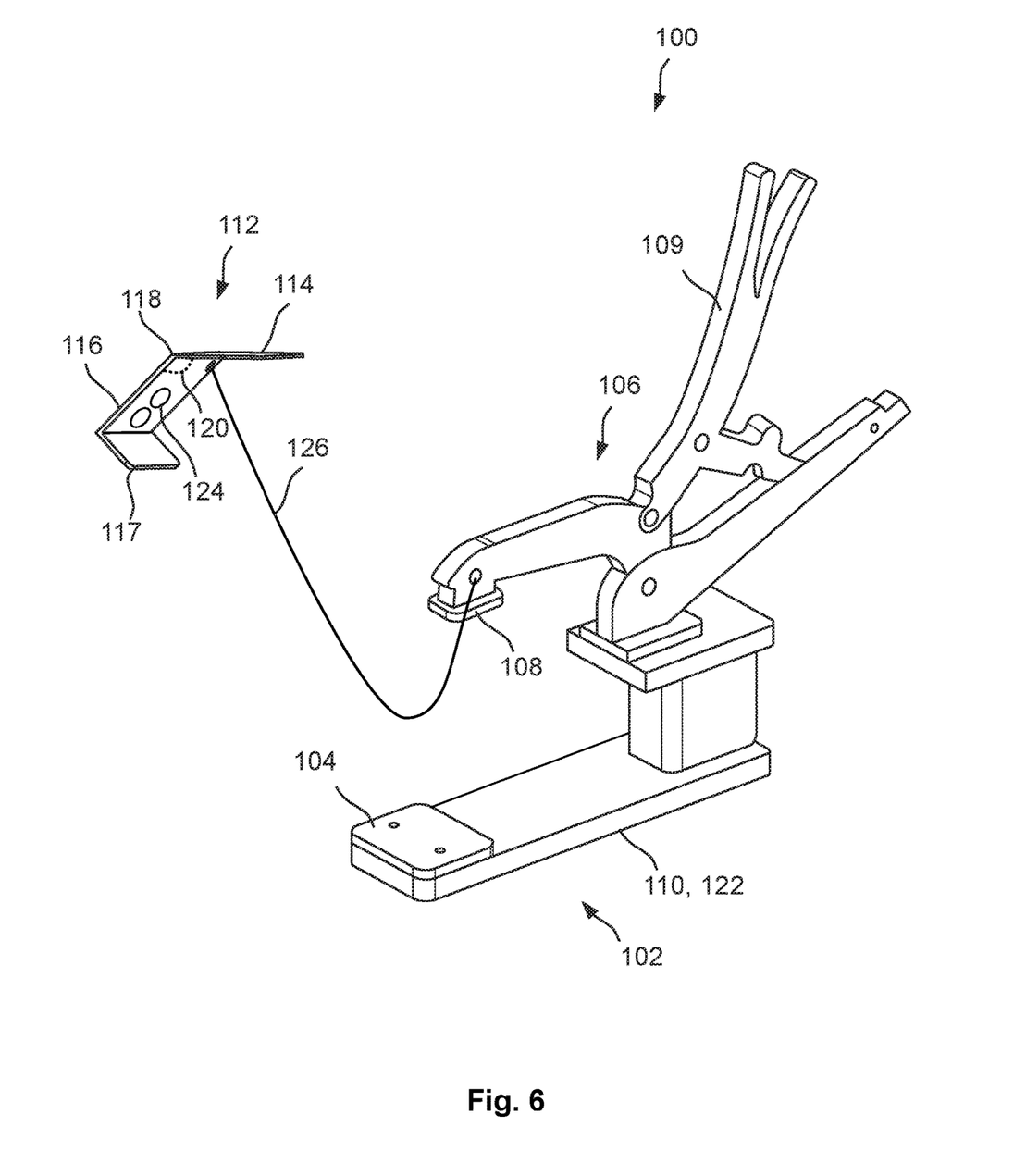
FIG. 6 is a schematic diagram illustrating an exemplary clamping tong.

FIG. 6 is a schematic diagram illustrating an exemplary clamping tong 100, such as a clamping tong 100 for securing a mould item part, e.g. a blade shell part of a wind turbine blade, in a mould for moulding the mould item part, such as the mould 80, 90 of FIG. 4 or 5.

The clamping tong 100 comprises a primary tong segment 102. The primary tong segment comprises a primary clamping surface 104 configured for applying clamping pressure on a clamping portion of the mould item part, e.g. on a blade shell part flange of a blade shell part. The primary clamping surface 104 may be provided with a friction enhancing material.

The clamping tong 100 comprises a secondary tong segment 106. The secondary tong segment 106 is coupled to the primary tong segment 102. The secondary tong segment 106 comprises a secondary clamping surface 108 configured for applying clamping pressure on a clamping portion of the mould, such as on a support frame of the mould. The clamping tong is configured to change, e.g. by a user operating a handle 109 of the clamping tong, between a clamping state and a release state, wherein the distance between the primary clamping surface 104 and the secondary clamping surface 108 in the clamping state is shorter than the distance between the primary clamping surface 104 and the secondary clamping surface 108 in the release state.

The clamping tong 100 comprises a tong coupling element 110 and a mould coupling element 112. In FIG. 6, the tong coupling element 110 is part of the primary tong segment, and the primary clamping surface 104 of the primary tong segment 102 is arranged on part of a surface of the tong coupling element 110. The tong coupling element 110 is configured to releasably engage with the mould coupling element 112.

Figure 7:
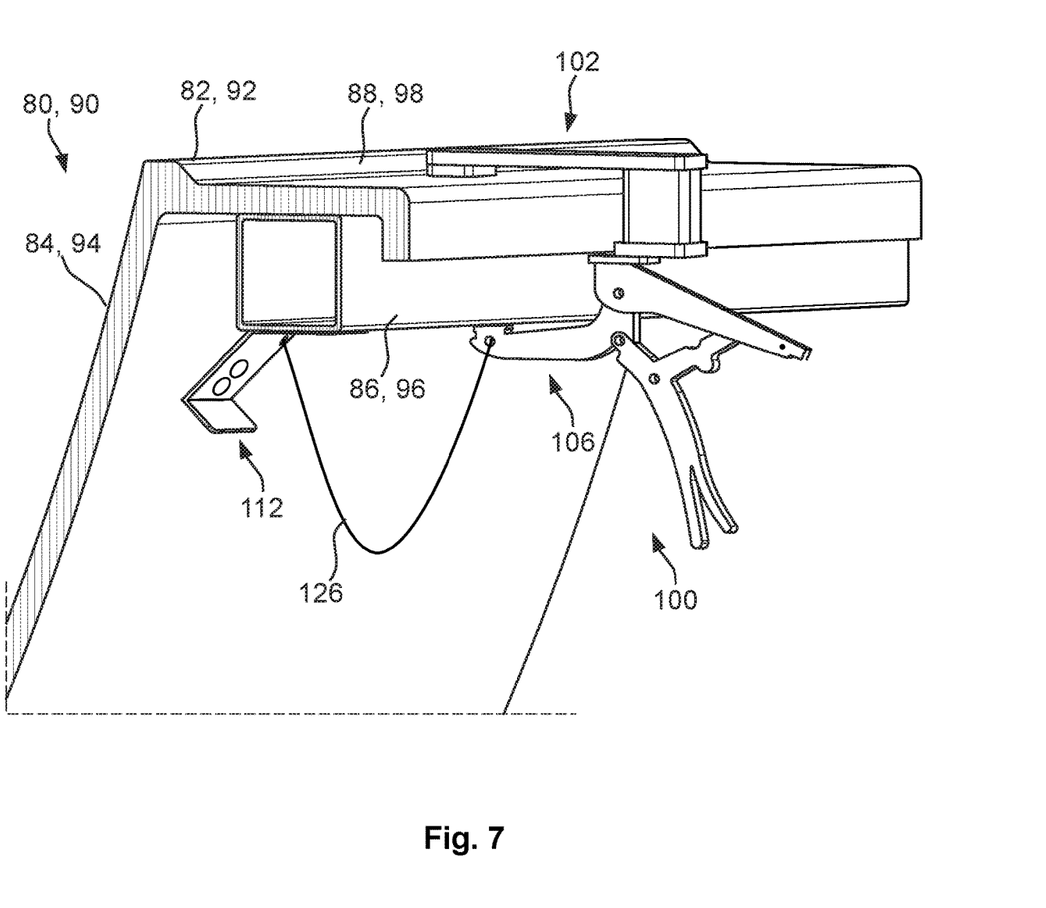
FIG. 7 is a schematic diagram illustrating an exemplary clamping tong being attached to an exemplary mould.
Figure 8:
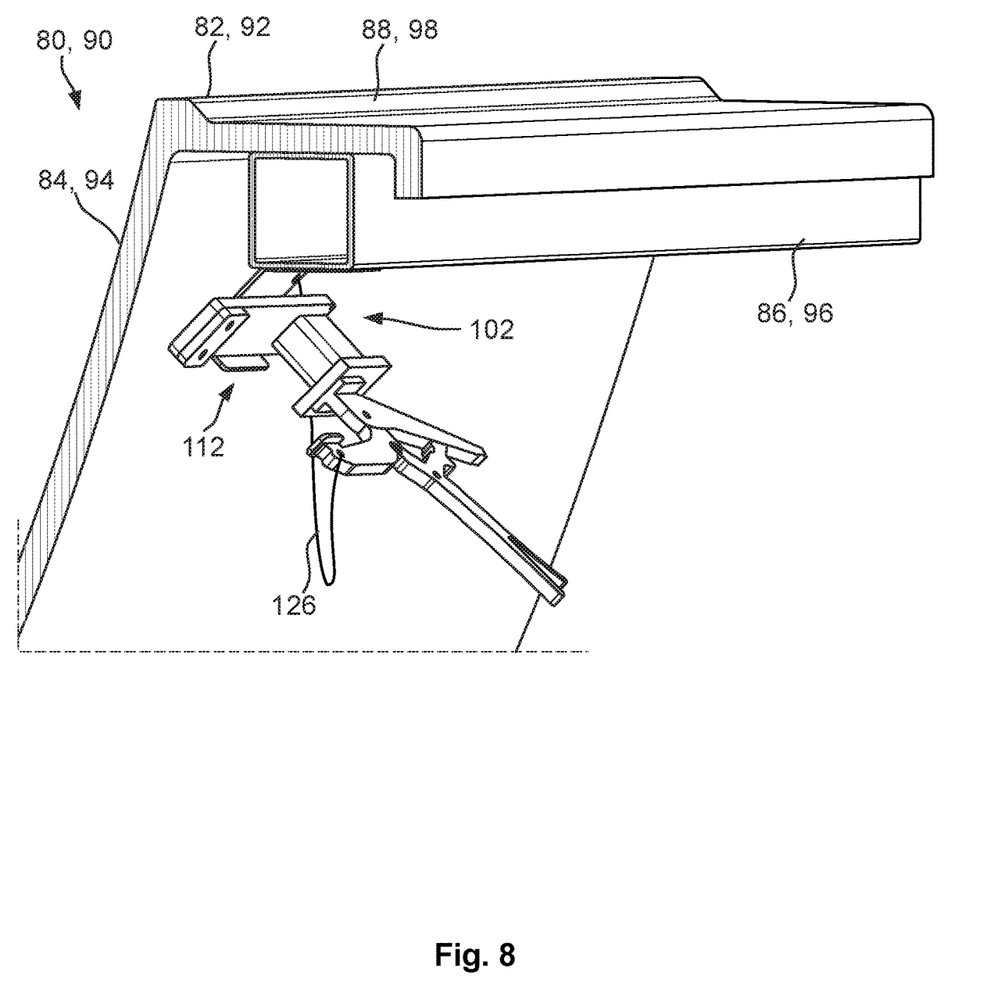
FIG. 8 is a schematic diagram illustrating an exemplary clamping tong being attached to an exemplary mould.

The clamping tong 100 can be arranged in an operating configuration as illustrated in FIG. 7 and in a storage configuration as illustrated in FIG. 8. The tong coupling element 110 is engaged with the mould coupling element 112 in the storage configuration and disengaged with the mould coupling element 112 in the operating configuration. In the operating configuration, the primary clamping surface of the primary tong segment applies clamping pressure on a clamping portion of the mould item part (not illustrated), arranged on the mould flange 88, 98 and the secondary clamping surface 108 of the secondary tong segment 106 applies clamping pressure on a clamping portion of the mould e.g. the support frame 88, 98. In the storage configuration, there is no contact between the primary clamping surface 104 of the primary tong segment and the mould item part. Furthermore, there is no contact between the secondary clamping surface 108 of the secondary tong segment and the mould 88, 98, in the storage configuration.

The tong coupling element 110 is configured to releasably engage with the mould coupling element 112 in a way such that an operator can arrange the clamping tong 100 in the storage configuration and change into an operating position and back again, by force of hand only, i.e. without the use of tools.

For example, the clamping tong coupling element may comprise a magnetic tong element 122 configured to magnetically attach to a magnetic mould element 124 of the mould coupling element. For example, the magnetic mould element may be a permanent magnet and the magnetic tong element may be a ferromagnetic material or another permanent magnet, arranged such that the magnetic tong element 122 and the magnetic mould element 124 exhibits and attractive magnetic force. This magnetic force should be strong enough for it to retain the primary tong segment 102 and the secondary tong segment 106 in an engaged position, while being weak enough to allow an operator to release the primary tong segment 102 and the secondary tong segment 106 from the mould coupling element 112.

The mould coupling element 112 is configured to be attached, such as fixedly attached, to the mould, e.g. to the support frame of the mould.

The mould coupling element 112 comprises a primary element portion 114 and a secondary element portion 116. The primary element portion 114 and the secondary element portion 116 are substantially planar and joined along a joint line 118. The primary element portion 114 and the secondary element portion forms a coupling element angle 120 about the joint line. For example, the coupling element angle 120 may be approximately 120 degrees, as illustrated.

The primary element portion 114 may be configured to be attached to the mould, e.g. to the support frame of the mould. The magnetic mould element 124 may be provided on the secondary element portion 116.

The clamping tong 100 further comprises a safety wire 126. The safety wire is configured to restrict displacement of at least part of the clamping tong 100 relative to the mould, such as to restrict displacement of the primary tong segment 102 and the secondary tong segment 106 relative to the mould. For example, the safety wire may prevent the primary tong segment 102 and the secondary tong segment 106 from falling towards the ground, in case of unintended or intended release of the clamping tong 100. Furthermore, the safety wire also may restrict the position of the mould where the clamping tong 100 is used. The safety wire 126 may extend from the mould coupling element 112 as illustrated. However, alternatively, the safety wire 126 may be coupled directly to the mould. The safety wire 126 may extend to the secondary tong segment 106, as illustrated. However, alternatively, the safety wire 126 may extend to the primary tong segment 106.

FIG. 7 is a schematic diagram illustrating the exemplary clamping tong 100 as described with respect to FIG. 6 being attached to a mould 80, 90, such as a mould 80, 90 in accordance with FIG. 4 or 5. The mould coupling element 112 of the clamping tong 100 is attached to the support frame 86, 96 of the mould 80, 90.

The clamping tong 100 in FIG. 7 is in its operating position, e.g. in the position wherein it is configured to secure a mould item, such as a shell part of a wind turbine blade, in the mould 80, 90. The clamping tong 100 is positioned such that the primary clamping surface may apply clamping pressure on a clamping portion of the mould item part being positioned in the mould 80, 90. The clamping tong 100 is positioned such that the secondary clamping surface 108 may apply clamping pressure on a clamping portion of the mould 80, 90, such as on a clamping portion of the support frame 86, 96 of the mould 80, 90.

Although not specifically illustrated, the mould 80, 90 may comprise a plurality of clamping tongs distributed along at least a part of the mould flange 88, 98.

FIG. 8 is a schematic diagram illustrating the same exemplary clamping tong 100 as described with respect to FIG. 7. However, as illustrated in FIG. 8, the clamping tong 100 is positioned in a storage position, wherein the tong coupling element of the primary tong segment 102 is engaged with the mould coupling element 112. Hence, with the mould coupling element 112 being attached to the mould 80, 90, such as to the support frame 86, 96 of the mould 80, 90, the clamping tong 100 may be conveniently stored at its appropriate position when not in use.

The invention has been described with reference to a preferred embodiment. However, the scope of the invention is not limited to the illustrated embodiment, and alterations and modifications can be carried out without deviating from the scope of the invention.

Throughout the description, the use of the terms "first", "second", "third", "fourth", "primary", "secondary", "tertiary" etc. does not imply any particular order or importance, but are included to identify individual elements. Furthermore, the labelling of a first element does not imply the presence of a second element and vice versa.

LIST OF REFERENCES 2 wind turbine
4 tower
6 nacelle
8 hub
10 blade
14 blade tip
15 tip end
16 blade root
17 root end
18 leading edge
20 trailing edge
24 first blade shell part (pressure side)
26 second blade shell part (suction side)
28 bond lines/glue joints
30 root region
32 transition region
34 airfoil region
34a first airfoil region
34b second airfoil region
36 first shell part flange
38 second shell part flange
40 shoulder
42 shear web or spar side
74 first spar cap
76 second spar cap
78 mould system
80 first mould
82 first mould element
84 first moulding surface
86 first support frame
88 first mould flange
90 second mould
92 second mould element
94 second moulding surface
96 second support frame
98 second first mould flange
100 clamping tong
102 primary tong segment
104 primary clamping surface
106 secondary tong segment
108 secondary clamping surface
109 tong handle
110 tong coupling element
112 mould coupling element
114 primary element portion
116 secondary element portion
117 tertiary element portion
118 joint line
120 coupling element angle
122 magnetic tong element
124 magnetic mould element
126 safety wire

The invention claimed is:

1. A clamping tong for securing a mould item part in a mould for moulding the mould item part, the clamping tong comprising:
a primary tong segment comprising a primary clamping surface for applying clamping pressure on a clamping portion of the mould item part;
a secondary tong segment coupled to the primary tong segment and comprising a secondary clamping surface for applying clamping pressure on a clamping portion of the mould; and
a mould coupling element configured to be attached to the mould,
wherein the clamping tong is configured to change between a clamping state and a release state, wherein a distance between the primary clamping surface and the secondary clamping surface in the clamping state is shorter than a distance between the primary clamping surface and the secondary clamping surface in the release state, and
wherein the clamping tong further comprises a tong coupling element configured to releasably engage with the mould coupling element, wherein the tong coupling element is engaged with the mould coupling element in a storage configuration.

2. The clamping tong according to claim 1, wherein the clamping tong can be arranged in an operating configuration, wherein the tong coupling element is disengaged with the mould coupling element in the operating configuration.

3. The clamping tong according to claim 1, wherein the primary clamping surface of the primary tong segment applies clamping pressure on the clamping portion of the mould item part in the operating configuration and the secondary clamping surface of the secondary tong segment applies clamping pressure on the clamping portion of the mould, in the operating configuration.

4. The clamping tong according to claim 1, wherein the primary clamping surface of the primary tong segment does not contact the mould item part in the storage configuration, and wherein the secondary clamping surface of the secondary tong segment does not contact the mould in the storage configuration.

5. The clamping tong according to claim 1, wherein the mould coupling element comprises a primary element portion being substantially planar and a secondary element portion being substantially planar, the primary element portion joining the secondary element portion along a joint line, wherein a coupling element angle is formed between the primary element portion and the secondary element portion about the joint line.

6. The clamping tong according to claim 5, wherein the coupling element angle is between 95-175 degrees.

7. The clamping tong according to claim 5, wherein the primary element portion of the mould coupling element is configured to be attached to the mould.

8. The clamping tong according to claim 1, wherein the mould coupling element is configured to be fixedly attached to the mould.

9. The clamping tong according to claim 1, wherein the primary tong segment comprises the tong coupling element.

10. The clamping tong according to claim 1, wherein the primary clamping surface is arranged on part of a surface of the tong coupling element.

11. The clamping tong according to claim 1, wherein the tong coupling element comprises a magnetic tong element configured to magnetically attach to a magnetic mould element of the mould coupling element.

12. The clamping tong according to claim 11, wherein the magnetic mould element of the mould coupling element is provided on a secondary element portion of the mould coupling element.

13. The clamping tong according to claim 1, comprising a safety wire configured to restrict displacement of the clamping tong relative to the mould.

14. The clamping tong according to claim 13, wherein the safety wire extends from the mould coupling element.

15. The clamping tong according to claim 13, wherein the safety wire extends to the secondary tong segment.

16. The clamping tong according to claim 1, wherein the primary clamping surface is provided with a friction enhancing material.

17. The clamping tong according to claim 16, wherein the friction enhancing material is a rubber material.

18. A mould system for moulding a mould item, the mould system comprising:
- a first mould for manufacturing a first mould item part of the mould item and a second mould for moulding a second mould item part of the mould item,
- wherein the first mould has a first mould element with a first moulding surface for defining an outer shape of the first mould item part and a first support frame to support the first mould element,
- wherein the second mould has a second mould element with a second moulding surface for defining an outer shape of the second mould item part and a second support frame to support the second mould element,
- wherein the mould system is configured to position the first mould and the second mould such that the first moulding surface is facing the second moulding surface and such that the first mould item part may be bonded with the second mould item part so as to form the mould item,
- wherein the mould system further comprises a first clamping tong, the first clamping tong comprising the clamping tong of claim 1, and
- wherein the mould coupling element of the first clamping tong is attached to the first mould at a first tong position.

19. The mould system according to claim 18, wherein the mould coupling element of the first clamping tong is attached to the first support frame of the first mould.

20. The mould system according to claim 18, comprising a plurality of clamping tongs, the plurality of clamping tongs including the first clamping tong, the plurality of clamping tongs being distributed along at least a part of the periphery of the first moulding surface.

21. The mould system according to claim 20, wherein the plurality of clamping tongs includes a second clamping tong, the second clamping tong comprising the clamping tong of claim 1, wherein the mould coupling element of the second clamping tong is attached to the first mould at a second tong position.

22. The mould system according to claim 18, wherein the mould item is a blade shell of a wind turbine blade, and the first mould item part is a first shell part of the blade shell and the second mould item part is a second shell part of the blade shell.

* * * * *